March 21, 1944. J. P. RATHBUN 2,344,899
LIQUID SEPARATING APPARATUS
Original Filed June 12, 1941
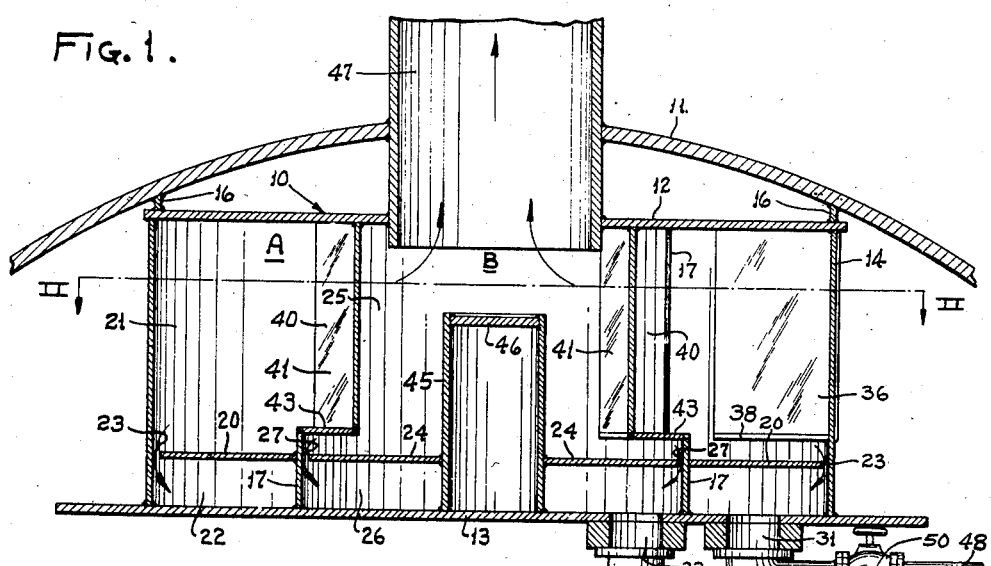
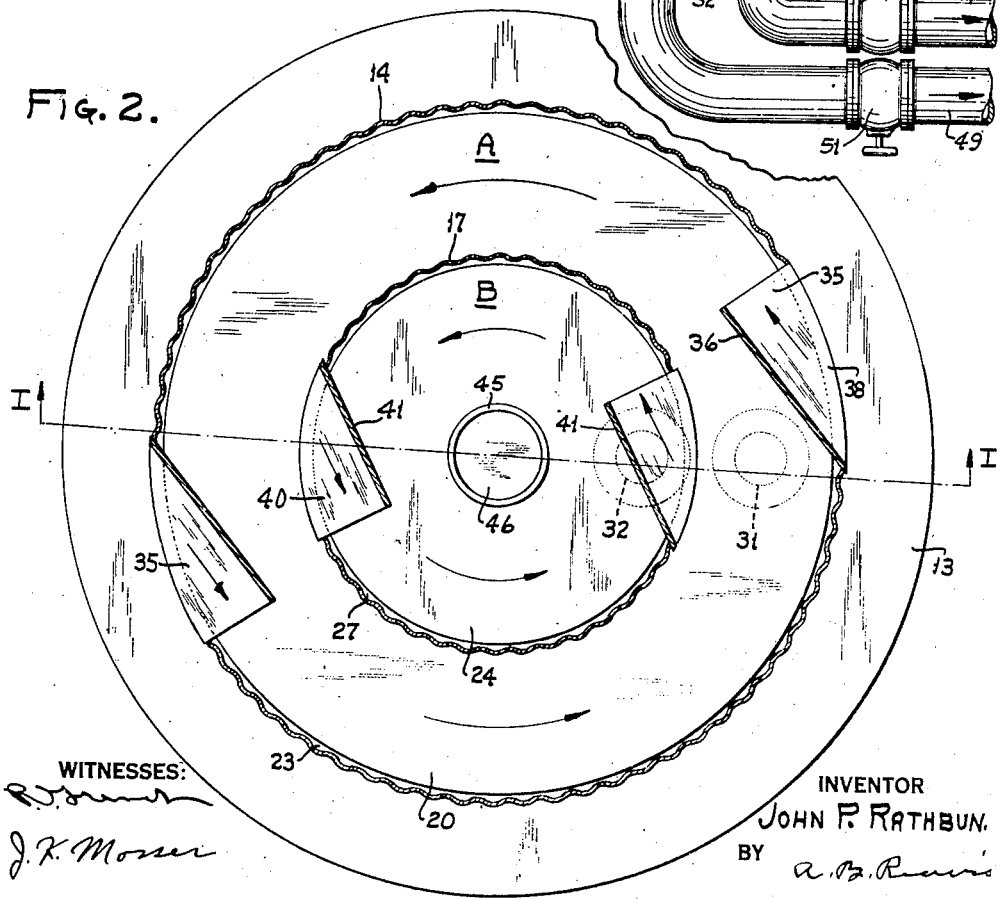
INVENTOR
JOHN P. RATHBUN.

Patented Mar. 21, 1944

2,344,899

UNITED STATES PATENT OFFICE 2,344,899

LIQUID SEPARATING APPARATUS

John P. Rathbun, Prospect Park, Pa., assignor to Westinghouse Electric & Manufacturing Company, East Pittsburgh, Pa., a corporation of Pennsylvania Original application June 12, 1941, Serial No. 397,747. Divided and this application August 31, 1943, Serial No. 500,614

1 Claim. (Cl. 183—84)

This invention relates to separating apparatus, more particularly to separators adapted to remove liquid from a gaseous fluid, and has for an object the provision of improved apparatus of this character.

Another object of the invention is the provision of a two-stage separator so arranged that the amount of separation occurring in each stage thereof may be controlled.

These and other objects are effected by the invention as will be apparent from the following description and claim taken in accordance with the accompanying drawing, forming a part of this application, in which:

Fig. 1 is a vertical sectional view taken along the line I—I of Fig. 2, looking in the direction indicated by the arrows; and, Fig. 2 is a horizontal sectional view taken along the line II—II of Fig. 1, looking in the direction indicated by the arrows.

Referring now to the drawing more in detail, there is shown, at 10, a two-stage separator adapted for use with various types of apparatus, for example, an evaporator 11, the separator 10 being positioned adjacent the top of the evaporator, as shown in Fig. 1. The separator 10 comprises an outer casing, defined by top and bottom walls 12 and 13, respectively, joined by an annular side wall 14. This casing may be secured to the apparatus with which it is used, in this case the shell of the evaporator 11, by suitable means, for example, the members 16.

The interior of the casing is divided into first and second stages A and B, respectively, by an inner annular member 17 extending from the top wall 12 to the bottom wall 13. Preferably, the outer annular wall 14 and the inner annular member 17 are concentrically disposed, and both are corrugated with the ribs and grooves thereof extending vertically.

A horizontal partition 20 divides the first stage A into an upper separating space 21 and a lower liquid collection space 22, the two spaces communicating at the outer edge of the partition, at 23. In like manner, a horizontal partition 24 divides the second stage B into an upper separating space 25 and a lower liquid collection space 26, communicating at the outer edge of the partition, at 27. The spaces 22 and 26 are provided with liquid discharge openings 31 and 32, respectively.

Passages 35 are provided for the flow of fluid to the first stage A of the separator and are defined by vertical side wall members 36 and bottom members 38, the tops of the passages being defined by the top wall 12 of the separator casing. Preferably, these passages are so arranged that the fluid passing therethrough enters the space A substantially tangential to the corrugated annular member 14.

In like manner, passages 40 are provided for the flow of fluid from the first stage A to the second stage B, these passages being defined by vertical side wall members 41, bottom members 43 and the top wall 12 of the separator casing. Preferably, these passages 40 likewise provide for tangential entry of fluid to the second stage B.

Tangential entry of the fluid to the various stages of the separator provides for circular or spiral flow of fluid through the apparatus. To further this objective, there is provided at the center of the second stage B a concentrically disposed structure comprising an annular wall 45, closed at its top by suitable means, such as the plate 46. An outlet 47 is provided from the top of the second stage B to the exterior of the separator.

In operation, fluid, for example steam, containing particles of liquid passes through the openings 35 into the first stage A of the separator, where it passes circumferentially or spirally along the inner surface of the corrugated member 14, with the result that centrifugal force causes the particles of moisture or liquid carried thereby to be thrown radially outwardly into the grooves provided by the corrugations, the liquid passing downwardly in the space 23 to the collection space 22, and the steam continuing through the openings 40 to the second stage B of the separator, where the separating action is repeated as the steam passes spirally or circumferentially along the inner surface of the corrugated annular member 17. The moisture, thrown by centrifugal force out of the stream of fluid into the grooves, flows downwardly through the space 27 to the collection chamber 26, the fluid from which the liquid has been removed exhausting through the discharge opening 47. It will be noted that the construction assures that steam passing through the second stage B is drawn from the innermost portion of the first stage A, where the liquid content of the steam is lowest. Thus the driest possible steam is discharged from the separator.

While under some conditions it may be satisfactory to have the two liquid collection chambers 22 and 26 in communication, or formed as a single chamber with a single outlet, it is frequently preferable to make use of the separated construction herein illustrated and to provide independent exhaust conduits 48 and 49 for the discharge openings 31 and 32, respectively. In this arrangement, the conduits 48 and 49 are provided with valves 50 and 51, respectively, whereby the flow of liquid and/or gas therethrough may be regulated. With such an arrangement, and with the conduits 48 and 49 in communication with a region of lower pressure than that existing within the separator, the relative amounts of separation performed by each stage of the separator may be controlled, thereby obtaining maximum efficiency of the separator as a whole.

While the invention has been shown in but one form, it will be obvious to those skilled in the art that it is not so limited, but is susceptible of various changes and modifications without departing from the spirit thereof, and it is desired, therefore, that only such limitations shall be placed thereupon as are specifically set forth in the appended claim.

This application is a division of my copending application, Serial No. 397,747, filed June 12, 1941.

What is claimed is:

A separator for removing liquid from a gaseous fluid; comprising top and bottom walls joined by an annular side wall; horizontal baffle structure dividing the space enclosed by said walls into an upper separating space and a lower liquid collection space; a liquid outlet from said collection space at the bottom thereof; a fluid outlet from the separation space through the top wall adjacent the center thereof and spaced radially inward a material distance from said annular side wall; and means for delivering gaseous fluid to the separation space with a whirling movement, the annular side wall serving to direct and maintain the whirling movement of the fluid and having its inner surface corrugated to provide recesses extending generally transversely to the direction of fluid flow therepast, whereby liquid may be thrown out of the whirling fluid by centrifugal action to flow down said recesses to the collection space.

JOHN P. RATHBUN.